Figure 1:
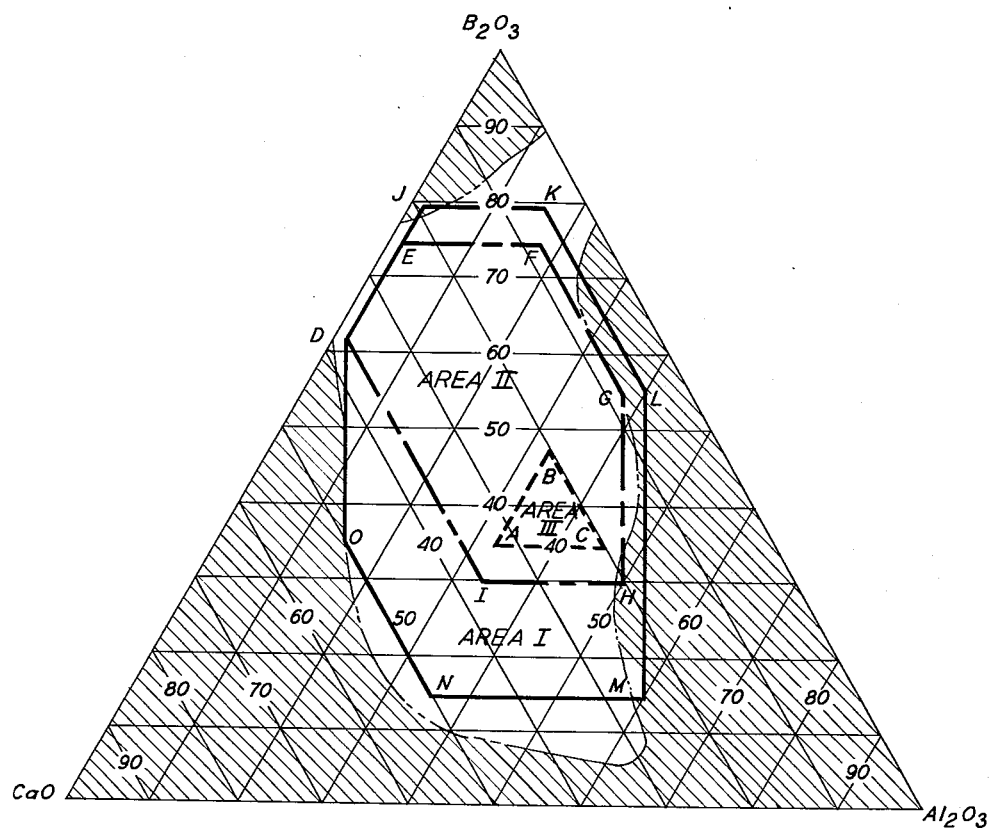

Aug. 22, 1961    H. A. McDONALD ET AL    2,997,402
REFRACTORY BRICK AND PREPARATION THEREOF
Filed April 23, 1958

INVENTORS.
HOWARD A. McDONALD
JAMES E. DORE
BY
*James E. Toomey*
ATTORNEY

United States Patent Office 2,997,402
Patented Aug. 22, 1961

2,997,402
REFRACTORY BRICK AND PREPARATION
THEREOF
Howard A. McDonald, Spokane, Wash., and James E. Dore, Milford, Conn., assignors to Kaiser Aluminum & Chemical Corporation, Oakland, Calif., a corporation of Delaware
Filed Apr. 23, 1958, Ser. No. 730,440
29 Claims. (Cl. 106—63)

This invention relates to a refractory material, and more particularly to a refractory material which is useful as lining for receptacles for holding molten aluminum; and it further relates to a homogeneous vitreous product containing oxides of boron, calcium and aluminum.

In the casting of metals such as aluminum and aluminum alloys, e.g. continuous or direct chill casting or other casting procedures, the metal is generally melted in open hearth or reverberatory furnaces which may be heated by means of oil, gas, coal or coke. The open hearth furnace usually comprises a melting hearth and a holding hearth lined with suitable refractory material and being in metal flow relationship. The charge of aluminum and any desired alloying constituents are preferably first added to the melting hearth to be melted and thereafter the molten metal is transferred to the holding hearth where it is subjected to cleaning treatments and where there is effected control of the composition and temperature of the molten bath. The treated molten metal may then be transferred from the holding hearth to the casting mold by means of a refractory lined transfer trough or poured directly from the furnace into the mold which may contain a baffle or metal distributor made of refractory material. Alternatively, the molten metal may be tapped from the holding hearth into a heated holding ladle, also lined with a suitable refractory material, and the ladle moved to the casting station where the molten metal is poured into a suitable transfer trough or directly into a mold. Although the open hearth or reverberatory furnace is conventionally used in melting aluminum and aluminum alloys, other types such as electric resistance heated or induction heated furnaces are sometimes utilized and, like the reverberatory furnace, are lined with a suitable refractory material.

The handling of metals such as aluminum and aluminum alloys in the manner above described has presented many problems in the past with regard to molten metal-refractory contact. Molten aluminum attacks most refractories by both chemical and physical action. Aluminum acts as a powerful reducing agent and is capable of reducing compounds such as silica and iron oxide to silicon and iron, respectively. Molten aluminum is also capable of penetrating into the pores of refractory material (bricks, mortars, castables, plastic refractories, ramming mixes, etc.) to a high degree in certain instances, resulting in a considerable increase in surface area exposed to chemical action. Such penetration may also give rise, in the case of intermittently heated furnaces, to spalling or rupture when metal, which has solidified within the pores, is remelted, as the coefficient of expansion of the metal is considerably greater than that of the refractory. The attack and penetration of refractories by molten aluminum, besides the disadvantages flowing therefrom of loss of metal and decreased refractory life, present a serious problem of contamination of the melt by element pick-up from the refractory and contamination of subsequent melts of different composition due to prior melt metal contained within the pores of the refractory.

A further problem present in the melting of aluminum and its alloys is one of cleaning the refractory to free it of metal and skim or dross. During use of the furnace, metal and skim tend to adhere to and build up on the refractory walls, and this coating gradually becomes quite dense and hard. The coating is generally removed periodically by chipping and, as a result, the refractory may be damaged.

It is an object of this invention to provide a novel refractory material for use in handling molten metals.

It is also an object of the invention to provide an advantageous method for making such refractory material.

A further object of this invention is to provide a product which imparts to refractory materials increased resistance to attack and penetration by molten aluminum metal, and other advantageous characteristics.

Another object of this invention is to provide an improved receptacle or furnace structure for the melting and handling of molten metals wherein physical and chemical attack of the refractory lining by the melt is eliminated or substantially reduced and the cleanability of the refractory is greatly improved, thereby increasing the useful life of the refractory lining.

It is a further object of this invention to provide a novel method and means for handling molten metals which eliminates or substantially reduces the problems attendant in metal handling as heretofore known.

Another object of this invention is to provide a novel method of handling molten metal, e.g., aluminum and aluminum alloys, wherein loss of metal by penetration into the refractory containing surface and contamination of the molten metal is eliminated or substantially reduced.

Other objects and advantages of the invention will be apparent from the following detailed description thereof.

In the annexed drawing, FIGURE 1 is a triaxial diagram showing the proportions in weight percentages in which the oxides of boron, calcium and aluminum are used to produce excellent results in one series of compositions according to the present invention.

According to the present invention it has now been found that the above disadvantages are overcome and the above objects are obtained by providing a homogeneous, vitreous, or glassy material which contains calcium oxide, boron oxide and aluminum oxide and the glassy material consists essentially of from 15% to 80% boron oxide, from 5% to 50% calcium oxide and from 2% to 60% of aluminum oxide. A preferred glassy material contains from 30% to 75% boron oxide, from 7.5% to 37.5% calcium oxide and from 2% to 50% of aluminum oxide. The glassy material contains not over 10% of silica.

It has been found that the glassy material described imparts excellent resistance to attack and penetration by molten aluminum to refractory materials in contact with such molten metal, the glass being added in amount from 5% to 15% based on the total dry weight of the refractory batch. The glassy material is preformed and is then intimately admixed with the refractory material or aggregate incorporating therein a bonding agent and the admixture is then formed into shape. By the term "aggregate" as used herein is meant a mixture of refractory grain plus bonding material. To produce a refractory shaped product according to this invention, refractory grain is admixed with from 5% to 15% of the glassy material herein defined, and is formed into shape in the known manner, with incorporation of a bond according to the usual good practice in this art.

The refractory grain or aggregate employed in making the refractory product according to this invention is acid, non-acid, neutral or basic, such as clay, alumina, magnesite, chromite, silicon carbide, periclase, spinel or other grain or aggregate. When the refractory product is employed in contact with molten aluminum metal, the grain is preferably aluminous grain, such as alumina, mullite or the like, preferably containing at least 98% of aluminum oxide. Excellent results are attained by admixing an aggregate of alumina grain and bond material containing at least 90% of aluminum oxide, and from 5% to 15% of a glass material, according to the present invention, consisting essentially of the composition represented preferably by that portion enclosed by line E—F—G—H—I—D—E, and forming to produce a refractory shaped article. The article so produced exhibits good resistance to spalling, good strength under load, and very good resistance to attack by molten aluminum. The best results have been obtained by admixing an alumina grain and bond mixture containing at least 90% aluminum oxide and from 8% to 12% of a glass of the composition represented by the portion of FIGURE 1 enclosed by line A—B—C.

The glass material is prepared by admixing calcium oxide, boron oxide, and aluminum oxide in the amounts defined above, or by admixing a compound of calcium, a compound of boron, a compound of aluminum and if desired other metal compounds, such compounds yielding or decomposing to provide the respective oxides upon heating and then fusing to cause reaction therebetween and to form a vitreous, homogeneous or uniform, glassy product or material. The material is then preferably cooled and comminuted to finely divided form prior to admixture with the refractory material. Preferably, the starting boron compound is chosen from the group consisting of metal borates, boric acid and boron oxide.

In order to prevent attack and penetration of the refractory product by molten aluminum metal, at least 5% of calcium oxide, at least 15% boron oxide and at least 2% aluminum oxide are incorporated in the glass. There can also be employed, in some embodiments at least one additional metal oxide component incorporated in the glass in amounts not greater than 15% of the total weight of the glass along with the boron oxide, calcium oxide and aluminum oxide of the general formula $R_2O$, $RO$, $R_2O_3$, $RO_2$, $R_2O_5$, where R is a metal, such as the oxide of magnesium, barium, beryllium, zirconium, zinc, vanadium, silicon, chromium and molybdenum. The table below shows some examples of glasses which are made according to this invention and shows the solubility in water thereof. This table also illustrates the substitution of oxides of magnesium, barium, chromium and silicon for portions of the calcium oxide and aluminum oxide. Glasses according to this invention, and which provide refractory products resistant to molten metal attack and penetration, exhibit low solubility in water and preferably the water solubility of such glass does not exceed about 4%. It has been found that the low water solubility results in greatly improved resistance of a refractory article to deterioration when subject to contact with moisture such as may be present in storage of refractory articles.

TABLE I

COMPOSITIONS AND RELATIVE WATER SOLUBILITIES OF STABLE GLASSES THAT HAVE BEEN PRODUCED USING OXIDES OTHER THAN CaO AND $Al_2O_3$

| Test No. | Composition of Glass, Weight Percent | | | | | | | Relative Water Solubility, Weight Percent |
|---|---|---|---|---|---|---|---|---|
| | CaO | $Al_2O_3$ | $B_2O_3$ | MgO | BaO | $Cr_2O_3$ | $SiO_2$ | |
| 1 | 20.0 | 20.0 | 60.0 | | | | | 0.465 |
| 2 | 15.0 | 20.0 | 60.0 | 5.0 | | | | 0.481 |
| 3 | 10.0 | 20.0 | 60.0 | 10.0 | | | | 0.436 |
| 4 | 5.0 | 20.0 | 60.0 | 15.0 | | | | 0.587 |
| 5 | 15.0 | 20.0 | 60.0 | | 5.0 | | | 0.575 |
| 6 | 10.0 | 20.0 | 60.0 | | 10.0 | | | 0.673 |
| 7 | 5.0 | 20.0 | 60.0 | | 15.0 | | | 0.544 |
| 8 | 20.0 | 15.0 | 60.0 | | | 5.0 | | 0.200 |
| 9 | 20.0 | 10.0 | 60.0 | | | 10.0 | | 0.397 |
| 10 | 15.0 | 20.0 | 60.0 | | | | 5.0 | 0.461 |
| 11 | 20.0 | 15.0 | 60.0 | | | | 5.0 | 0.739 |

The solubility in water is measured by placing a weighed amount of the glass sample of a particle size passing 35 mesh and retained on 48 mesh, that is, of from 0.295 to 0.417 mm. diameter, in water at 29° C., holding for one hour without stirring, and measuring loss in weight of the glass.

In preparing refractory products by incorporating the glass material in a batch of predominantly alumina aggregate material, especially such a batch wherein the aggregate contains at least 70% aluminum oxide or, preferably, at least 90% aluminum oxide, the remainder consisting essentially of silica and a minor proportion of impurities normally found in such aggregate such as iron oxide, titanium oxide, alkalies and alkaline earths, glasses within the unshaded area of FIGURE 1 are preferably added. It has been found that glasses within the line D—J—K—L—M—N—O—D are substantially free of any tendency to devitrify under the conditions of use, have the desired low water solubility, are homogeneous and provide the described resistance to attack and penetration by molten metal, particularly with 90% alumina aggregate. The glasses within the line D—E—F—G—H—I—D are preferred, however, in the production of alumina refractories exhibiting higher hot load strengths and higher thermal shock resistance. Alumina refractories, made as described herein incorporating glasses within the lines A—B—C, have excellent resistance to attack by molten metal and very good refractory properties, and exhibit very little or substantially no volume change upon firing. The silica content of the glass is maintained at not exceeding 10%, based on the total weight of the glass. It is also preferred that the alumina aggregate employed contain not over 5% total impurities other than silica, such as iron oxide, titanium oxide, alkalies and alkaline earths.

In examples of the production of a refractory product according to this invention, there are described below the production of high alumina bricks and the resistance thereof to molten metal attack.

*Example I*

Approximately 1500 pounds of glass consisting essentially of 23% CaO, 40% $Al_2O_3$, 37% $B_2O_3$ was made by admixing finely divided calcium carbonate, finely divided alumina and finely divided boric acid and heating to fuse and cause reaction to form a homogeneous glassy product which was then cooled and comminuted to pass through a 100 mesh screen. This comminuted glass was then dry blended with 15,000 pounds of an alumina aggregate material which contained after firing, 90.4% aluminum oxide, 8.54% silicon dioxide, 0.25% iron oxide, 0.02% titanium dioxide, 0.02% calcium oxide, 0.11% magnesium oxide and 0.44% potassium oxide plus sodium oxide, the remainder being a minor amount of impurities found in such aggregate as is well known in this art. This alumina aggregate was of minus 4 mesh particle size. To this was added 980 pounds of water. The batch was thoroughly mixed until complete moisture distribution was assured. A plurality of bricks from this material was pressed in a mechanical press at a pressure of 1,000 pounds per square inch. The bricks were allowed to air dry for 24 hours then force dried for 24 hours at 110° C. When cool, the bricks were fired to a temperature of 1375° C. at about 38° C. per hour. The maximum temperature was held for a period of one hour. The bricks so obtained had good refractoriness and resistance to spalling and exhibited excellent resistance to metal attack and penetration.

*Example II*

Approximately 0.5 pound of glass consisting essentially of 23% CaO, 40% $Al_2O_3$ and 37% $B_2O_3$ was made by admixing finely divided calcium carbonate, finely divided alumina and finely divided boric acid and heating to fuse and cause reaction to form a homogeneous glassy product, which was then cooled and comminuted to pass through a 100 mesh screen. This comminuted glass was then dry blended with approximately 5 pounds of an alumina aggregate of minus 4 mesh particle size which contained after firing 90.4% aluminum oxide, 8.54% silicon dioxide, 0.25% iron oxide, 0.02% titanium dioxide, 0.02% calcium oxide, 0.11% magnesium oxide, and 0.44% potassium oxide plus sodium oxide, the remainder being a minor amount of impurities found in such aggregate as is well known in this art. To this mixture was added 0.33 pound of water. The batch was mixed until complete moisture distribution was assured. The material was then placed in a mold box of a heavy duty hydraulic press and on brick measuring 2¼" x 2½" x 9" was pressed at 2470 pounds per square inch. The test piece was allowed to air dry for 24 hours and then force dried for 24 hours at 110° C. When the piece was cooled it was fired to a temperature of 1375° C. at a rate of increase at about 38° C. per hour. The maximum temperature was held for a period of one hour. Comparative tests were made between this brick and a standard 90% alumina brick as obtained in commerce without a glass additive as described herein.

A one-half inch diameter hole was drilled through one end of each brick and each brick was then fitted in a specimen support bracket for testing. Each specimen and bracket was preheated to approximately 540° C. and immersed in molten 7075 aluminum alloy at 770° C. Due to heating the composition of the 7075 aluminum alloy varied from day to day and replenishment had to be made for various ingredients. However the composition of the 7075 aluminum alloy was maintained within the following limits; silicon 0.5% maximum, iron 0.7% maximum, copper 1.2 to 2.0%, manganese 0.30% maximum, magnesium 2.1 to 2.9%, chromium 0.18 to 0.40%, zinc 5.1 to 6.1%, titanium 0.2% maximum. Other ingredients were maintained at a maximum of 0.05% of each ingredient, the total of all such ingredients being maintained at a maximum of 0.15%, the balance aluminum. The standard brick specimen was tested for 14 days and the specimen of the brick of this invention was tested for 17 days. Both bricks were then sectioned. The standard 90% commercial alumina brick containing no glass additive clearly exhibited metal penetration and attack across the entire thickness of the brick, whereas in the brick made according to this invention, the metal adhered to the surface but did not penetrate or attack the brick to a depth of more than ⅛ inch at any point.

In making up or installing a furnace or receptacle lining according to the invention, it has been found advantageous to incorporate as bonding material between bricks made according to the invention, a mortar comprising an alumina aggregate, preferably containing at least 90% aluminum oxide, and as bonding agent, from 2.5% to 7.5% of magnesium borate and, if desired, a minor amount of glass according to this invention. Such a mortar containing from 2.5% to 7.5% magnesium borate and 10% of glass containing 22.7% CaO, 39.8% $Al_2O_3$, 36.0% $B_2O_3$ and 1.4% $SiO_2$, exhibits substantially no attack by molten aluminum metal whereas a commercial mortar containing 90% alumina and sodium silicate as air-setting or cold bond exhibits attack by molten aluminum metal throughout its thickness. This is demonstrated by the following example.

*Example III*

A series of small crucibles were made by mixing 90% alumina aggregate of minus 48 mesh particle size, and the other ingredients as shown in Table II below. Another crucible was made up of standard 90% alumina air-setting mortar as obtained in commerce. Molten 7075 aluminum alloy was held at 770° C. for seven days in the test crucibles made according to this invention, and for only six days in the test crucible made from the mortar as obtained in commerce; after which the metal was removed and the crucibles were cut in half vertically and examined for metal attack. The glass added contained 22.7% CaO, 39.9% $Al_2O_3$ and 36.0% $B_2O_3$ and 1.4% $SiO_2$ and was made as described in Example I.

TABLE II

| Test No. | Addition Agents According to the Invention | |
|---|---|---|
| | Magnesium Borate, percent | Other, percent Glass |
| A | 2.5 | 10 |
| B | 5.0 | 10 |
| C | 7.5 | 10 |

Upon examination of the sectioned crucibles after the test as described above, the commercial mortar crucible exhibited after the 6 days' holding, complete metal attack through its entire thickness. The test crucibles A, B, and C were completely free of metal attack and furthermore were easily cleaned of any adhering material. If desired, there may be admixed with the alumina aggregate in the making of the mortar, magnesia and boric acid, instead of pre-formed magnesium borate. The mortars so obtained have excellent strengths and refractoriness under the conditions of use.

A molten aluminum receptacle according to the invention comprises in one embodiment a metal shell and disposed therein refractory bricks or blocks prepared as described hereinabove, for instance, as described in Example I, the bricks being installed with a layer, between each pair of bricks, of mortar of the composition as described in Example III containing 2.5 to 7.5% magnesium borate and 10% of the glass as described. Such a receptacle exhibits excellent service, the refractory lining having exceptional resistance to attack by molten aluminum metal and being readily cleaned after use because the contents do not attack and adhere to the lining.

In producing refractory articles according to the invention, it will be understood that, if desired, there are also incorporated bonding agents, such as clay, lignin compounds, waste sulfite liquor, boric acid and chromic acid. Such bonding agents are admixed in the amounts generally used according to good refractory practice. The refractory batches are prepared by mixing the refractory aggregate and the glass as described hereinabove, and the bond, if desired, with tempering amounts of water, or other liquid, that is, with sufficient water or liquid to provide a moldable mass, if pressed; or to slip cast, if desired. In pressing the brick, pressures of at least 1000 pounds per square inch are preferred. The refractory batches containing the refractory aggregate and the glass according to the invention are fired without general fusion, preferably at about from 1300° C. to 1450° C. to produce nonfused refractory shapes or products. It will be understood, however, that the refractory grain, e.g. alumina or other grain, can have been made by a fusion process. While a glass particle size capable of passing through a 100 mesh screen was employed in the specific examples of this invention it will be understood that coarser particle sizes can be employed. In general the finer the particle size of the glass the better the resistance to attack exhibited by the brick incorporating the glass.

In conformity with common practice in reporting chemical analyses of refractory or glass materials, in the specification and claims the proportions or amounts of the various chemical constituents are expressed in some instances as though these constituents were present as the simple oxides. Thus, the calcium constituent is expressed as CaO; the boron constituent as $B_2O_3$; the aluminum constituent as $Al_2O_3$; although the constituents may be present in combination with each other, or in some instances with a small amount of the grain component or with an impurity. For example, "5% CaO" is intended to mean that a chemical analysis of the material or product would show the calcium content as 5%, expressed or calculated as CaO, although all of it may be present as a glassy ternary compound with alumina and boron oxide, or as another compound. In the specification and claims all percentages and parts are by weight unless otherwise indicated. The mesh sizes given herein are Tyler scale as set forth on page 1719 of "Chemical Engineers' Handbook," John H. Perry, editor-in-chief, 2nd edition, McGraw-Hill Book Co., 1941. Where boric acid is referred to herein there is intended to be included orthoboric acid, pyroboric acid and metaboric acid, but in most instances it is most convenient to employ orthoboric acid as a cheaper and readily available source material.

Having now described the invention, what is claimed is:

1. A nonfused refractory product, characterized by high resistance to attack and penetration by molten aluminum metal, consisting essentially of a refractory aggregate material and in intimate admixture therewith from 5% to 15% of a preformed vitreous, homogeneous glassy product consisting essentially of from 15% to 80% boron oxide, from 5% to 50% calcium oxide, from 2% to 60% aluminum oxide, the remainder being not over 15% of an oxide of at least one other metal chosen from the group consisting of magnesium, barium, beryllium, zirconium, zinc, vanadium, chromium and molybdenum, said vitreous product containing not more than 10% $SiO_2$.

2. Composition as in claim 1 wherein said glassy product contains not over 15% of chromium oxide.

3. Composition as in claim 1 wherein said glassy product contains not over 15% of barium oxide.

4. Composition as in claim 1 wherein said glassy product contains not over 15% magnesium oxide.

5. A nonfused refractory composition resistant to attack and penetration by molten aluminum comprising a refractory aggregate material and in intimate admixture therewith from 5% to 15% of a preformed vitreous, glassy product having a composition represented by the portion of FIGURE 1 of the attached drawings and enclosed by line J—K—L—M—N—O—D—J.

6. Composition as in claim 5 wherein the grain material of said refractory aggregate is alumina.

7. Composition as in claim 5 wherein said vitreous product is represented by the portion of said FIGURE 1 enclosed by lines E—F—G—H—I—D—E.

8. Composition as in claim 7 wherein the grain material of said refractory aggregate is alumina.

9. Composition as in claim 5, wherein said vitreous product is represented by the portion of said FIGURE 1 enclosed by lines A—B—C.

10. Composition as in claim 9 wherein said refractory aggregate material contains at least 90% aluminum oxide.

11. A nonfused refractory composition consisting essentially of a refractory aggregate material and in intimate admixture therewith from 5% to 15% of a preformed vitreous homogeneous glassy product consisting essentially of from 2% to 60% aluminum oxide, from 15% to 80% boron oxide and from 5% to 50% calcium oxide, said glassy product containing not more than 10% of silica.

12. Composition as in claim 11 wherein said glassy product has a solubility in water not exceeding 4%.

13. A nonfused refractory shaped article consisting essentially of a refractory aggregate material and in intimate admixture therewith a bonding agent and 5% to 15% of a preformed vitreous homogeneous glassy product consisting essentially of from 2% to 60% aluminum oxide, from 15% to 80% boron oxide and from 5% to 50% calcium oxide, said vitreous product containing not more than 10% $SiO_2$.

14. Article as in claim 13 wherein said refractory aggregate material contains at least 90% aluminum oxide.

15. In a receptacle for holding molten aluminum metal, a refractory lining resistant to attack and penetration by molten aluminum and composed of nonfused refractory material consisting essentially of refractory aggregate material and in intimate admixture therewith from 5% to 15% of a preformed, vitreous, homogeneous glassy product consisting essentially of from 5% to 50% of calcium oxide, from 15% to 80% of boron oxide, from 2% to 60% of aluminum oxide, the remainder being not over 15% of an oxide of at least one other metal chosen from the group consisting of magnesium, barium, beryllium, zirconium, zinc, vanadium, chromium and molybdenum, said vitreous product containing not more than 10% $SiO_2$.

16. A refractory lining as in claim 15 wherein the grain material of said aggregate is alumina and said glassy product consists essentially of from 5% to 50% calcium oxide, from 15% to 80% boron oxide and from 2% to 60% aluminum oxide.

17. A refractory lining as in claim 15 wherein said glassy product consists essentially of from 7.5 to 37.5% calcium oxide, from 30% to 75% boron oxide and from 2% to 50% aluminum oxide.

18. A refractory lining as in claim 15 wherein said glassy product consists essentially of from 20% to 33% calcium oxide, from 35% to 48% boron oxide and from 32% to 45% aluminum oxide.

19. A refractory lining as in claim 15 wherein said aggregate contains at least 70% of aluminum oxide.

20. A refractory lining as in claim 15 wherein said aggregate contains at least 90% of aluminum oxide.

21. A vitreous, homogeneous glassy product having a composition represented by the portion of FIGURE 1 of the attached drawings and enclosed by line A—B—C.

22. In the method of preparing a refractory product resistant to attack and penetration by molten aluminum, the steps which comprise preparing an admixture consisting essentially of a boron compound chosen from the group consisting of metal borates, boron oxide and boric acid, a calcium compound which decomposes upon heating to form calcium oxide, an aluminum compound which decomposes upon heating to form aluminum oxide, and the remainder at least one compound of another metal chosen from the group consisting of magnesium, barium, beryllium, zirconium, zinc, vanadium, chromium and molybdenum, which decomposes upon heating to form the oxide of said compound, and fusing said admixture to cause reaction between said compounds and to form a homogeneous, vitreous product consisting essentially of from 15% to 80% boron oxide, from 5% to 50% calcium oxide and from 2% to 60% aluminum oxide, said vitreous product containing not more than 10% $SiO_2$ and not over 15% of said oxide of another metal, comminuting said fused product, and admixing said comminuted product with from 85% to 95% of refractory aggregate.

23. In the method of preparing a refractory product resistant to attack and penetration by molten aluminum, the steps which comprise preparing an admixture consisting essentially of a boron compound chosen from the group consisting of metal borates, boron oxide and boric acid, a calcium compound which decomposes upon heating to form calcium oxide, and an aluminum compound which decomposes upon heating to form aluminum oxide, and fusing said admixture to cause reaction between said compounds and to form a homogeneous, vitreous product consisting essentially of from 15% to 80% boron oxide, from 5% to 50% calcium oxide, and from 2% to 60% aluminum oxide, said vitreous product containing not more than 10% $SiO_2$, comminuting said vitreous product, and admixing said comminuted product with from 85% to 95% of refractory aggregate.

24. Method as in claim 23 wherein the aggregate of said refractory is alumina.

25. Method as in claim 23 wherein said refractory aggregate contains at least 90% aluminum oxide.

26. Method for preparing a shaped refractory product resistant to attack and penetration by molten aluminum comprising preparing an admixture consisting essentially of a boron compound chosen from the group consisting of metal borates, boron oxide and boric acid, a calcium compound which decomposes upon heating to form calcium oxide, and an aluminum compound which decomposes upon heating to form aluminum oxide, and fusing said admixture to cause reaction between said compounds and to form a homogeneous, vitreous product consisting essentially of from 15% to 80% boron oxide, from 5% to 50% calcium oxide, and from 2% to 60% aluminum oxide, said vitreous product containing not more than 10% silica, comminuting said vitreous product, and admixing said comminuted product with from 85% to 95% of refractory aggregate, forming into shape and firing without general fusion.

27. In a receptacle for holding molten aluminum metal, a nonfused refractory brick lining resistant to attack and penetration by molten aluminum metal, each brick of said lining consisting essentially of refractory aggregate material and in intimate admixture therewith from 5% to 15% of a preformed, vitreous, homogeneous glassy product consisting essentially of from 5% to 50% calcium oxide, from 15% to 80% boron oxide and from 2% to 60% aluminum oxide, said vitreous material containing not more than 10% silica, said bricks being bonded to each other by a mortar consisting essentially of alumina particles, from 2.5% to 7.5% magnesium borate and a minor amount of said glassy product.

28. Refractory lining as in claim 27 wherein said refractory aggregate material contains at least 70% aluminum oxide.

29. Refractory lining as in claim 27 wherein said refractory aggregate material contains at least 90% aluminum oxide.

References Cited in the file of this patent

UNITED STATES PATENTS

| | | |
|---|---|---|
| 1,609,329 | Taylor | Dec. 7, 1926 |
| 1,736,642 | Beaudry | Nov. 19, 1929 |
| 2,030,389 | Navias | Feb. 11, 1936 |
| 2,419,472 | Thiess | Apr. 22, 1947 |
| 2,502,198 | Benner et al. | Mar. 28, 1950 |